(12) United States Patent
Kusano et al.

(10) Patent No.: US 8,035,950 B2
(45) Date of Patent: Oct. 11, 2011

(54) RESISTIVE PASTE AND MONOLITHIC CERAMIC CAPACITOR

(75) Inventors: Mitsuhiro Kusano, Omihachiman (JP); Shizuharu Watanabe, Omihachiman (JP)

(73) Assignee: Murata Manufacturing Co., Ltd., Nagokakyo-Shi, Kyoto-fu (JP)

( * ) Notice: Subject to any disclaimer, the term of this patent is extended or adjusted under 35 U.S.C. 154(b) by 96 days.

(21) Appl. No.: 12/533,311

(22) Filed: Jul. 31, 2009

(65) Prior Publication Data
US 2009/0284898 A1 Nov. 19, 2009

Related U.S. Application Data

(63) Continuation of application No. PCT/JP2008/051485, filed on Jan. 31, 2008.

(30) Foreign Application Priority Data

Feb. 6, 2007 (JP) .................. 2007-026510

(51) Int. Cl.
*H01G 4/228* (2006.01)
*H01G 4/005* (2006.01)
(52) U.S. Cl. ..................... 361/306.3; 361/303

(58) Field of Classification Search ............. 361/303, 361/311, 306.1, 306.3, 308.1, 309
See application file for complete search history.

(56) References Cited

FOREIGN PATENT DOCUMENTS

| EP | 1480233 | A1 | 11/2004 |
|---|---|---|---|
| EP | 1783790 | A1 * | 5/2007 |
| JP | 63-017501 | A | 1/1988 |
| JP | 1147802 | A | 6/1989 |
| JP | 2-166702 | A | 6/1990 |
| JP | 2001-236825 | A | 8/2001 |
| JP | 2003-257242 | A | 9/2003 |
| WO | WO-2006-022060 | A1 | 3/2006 |
| WO | WO-2006-022258 | A1 | 3/2006 |

* cited by examiner

*Primary Examiner* — Eric Thomas
(74) *Attorney, Agent, or Firm* — Dickstein Shapiro LLP (57) ABSTRACT

The formation of a resistive electrode layer as a portion of an external electrode of a monolithic ceramic capacitor by baking a resistive paste, which contains ITO, a glass frit, and an organic vehicle, to impart the function of a resistance element to the external electrode may lead to the occurrence of blisters or reduced denseness. This is modulated when the resistive paste further contains a densification promoting metal or oxide, which promotes densification of a sintered compact of the resistive paste, and a densification preventing metal oxide, which prevents the densification.

20 Claims, 4 Drawing Sheets

PERCENTAGE OF HIGH-RESISTANCE PASTE (WEIGHT %)

US 8,035,950 B2

RESISTIVE PASTE AND MONOLITHIC CERAMIC CAPACITOR

This is a continuation of application Ser. No. PCT/JP2008/051485, filed Jan. 31, 2008, which is hereby incorporated herein by reference.

TECHNICAL FIELD

The present invention relates to a resistive paste and a monolithic ceramic capacitor manufactured using the resistive paste and, more particularly, to a resistive paste that is advantageously used to form at least part of an external electrode in order to impart the function of a CR composite electronic component to a monolithic ceramic capacitor and a monolithic ceramic capacitor manufactured using the resistive paste.

BACKGROUND ART

Use of a monolithic ceramic capacitor for decoupling in the vicinity of a CPU may cause an oscillation due to parallel resonance in a circuit and increase impedance, because the equivalent series resistance (ESR) of the monolithic ceramic capacitor is very low. In such a monolithic ceramic capacitor, therefore, the ESR is sometimes required to be controlled in the range of several tens to several thousands of milliohms. In response to this demand, one proposed monolithic ceramic capacitor includes an external electrode that also functions as a resistance element.

Thus, International Publication WO 2006/022258 (Patent Document 1) describes a monolithic ceramic capacitor that includes an internal electrode containing Ni or a Ni alloy, in which an external electrode has sufficient reduction resistance and includes a resistive electrode layer, which includes an In—Sn complex oxide (ITO) reactive to the Ni or Ni alloy contained in the internal electrode and a glass component.

According to the technique described in Patent Document 1, advantageously, the external electrode can have sufficient resistance, a conductive layer for continuity between the external electrode and the internal electrode is not needed under the resistive electrode layer, and a protective layer for protecting the resistive electrode layer does not require an expensive non-oxidizable metal.

Patent Document 1 also discloses that part of ITO is substituted by Ag, $Al_2O_3$, or $ZrO_2$ to control the resistance.

However, it was found that an increase in the substitution rate of Ag, $Al_2O_3$, or $ZrO_2$, for example, to increase the resistance may lead to the occurrence of blisters due to oversintering or reduced denseness due to insufficient sintering. Even if the resistive electrode layer has a constant resistance, the ESR may easily vary with the dimensions of a ceramic laminate, which is a component of the monolithic ceramic capacitor, the thickness of the resistive electrode layer, and the number of laminated layers in the internal electrode. Thus, resistive pastes having different substitution rates of Ag, $Al_2O_3$, or $ZrO_2$ for different designs, such as the dimensions of the ceramic laminate, the thickness of the resistive electrode layer, and the number of laminated layers in the internal electrode, must be prepared to achieve a desired ESR.

[Patent Document 1] International Publication WO 2006/022258

DISCLOSURE OF INVENTION

Problems to be Solved by the Invention

It is an object of the present invention to provide a resistive paste with which the problems described above can be solved and a monolithic ceramic capacitor manufactured using the resistive paste.

Means for Solving the Problems

As a result of repeated investigations to solve the problems described above, the present inventors found that some metal species or oxide species to be substituted for part of ITO promote densification of a resistive electrode layer, and others prevent the densification, and that the metal species and/or oxide species to be substituted for part of ITO and their substitution rates can be properly determined to form a dense resistive electrode layer without causing blisters. The present inventors also found that, although a metal-substituted resistive paste is a low-resistance paste and an oxide-substituted resistive paste is a high-resistance paste, the low-resistance paste and the high-resistance paste can be mixed to facilitate the control of the ESR and to provide a resistive electrode layer of excellent film quality.

Utilizing these discoveries, the present invention is directed to a resistive paste that contains an In—Sn complex oxide, a glass frit, and an organic vehicle.

A resistive paste according to a first aspect of the present invention further includes a densification promoting metal that promotes densification of a sintered compact formed by firing the resistive paste and is at least one selected from the group consisting of Ni and Cu; and a densification preventing metal that prevents the densification and is at least one selected from the group consisting of Mo, Cr, and Nb.

Figure 5:
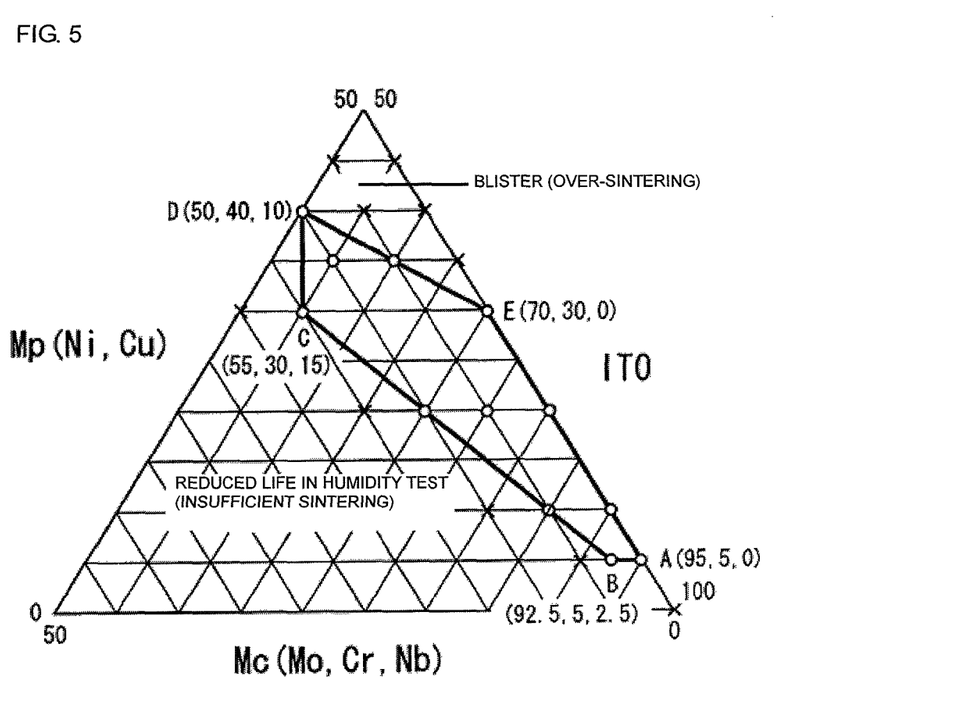
FIG. 5 is a ternary diagram of ITO, a densification promoting metal Mp (Ni, Cu), and a densification preventing metal Mc (Mo, Cr, Nb) contained in a resistive paste prepared in Experimental Example 3.

A resistive paste according to a second aspect of the present invention further includes a densification promoting metal (Mp) that promotes densification of a sintered compact formed by firing the resistive paste and is at least one selected from the group consisting of Ni and Cu; and a densification preventing metal (Mc) that prevents the densification and is at least one selected from the group consisting of Mo, Cr, and Nb, wherein the component ratio (ITO, Mp, Mc) of the In—Sn complex oxide (ITO), the densification promoting metal (Mp), and the densification preventing metal (Mc) on the basis of volume percent is in a range included by a polygon defined by point A (95, 5, 0), point B (92.5, 5, 2.5), point C (55, 30, 15), point D (50, 40, 10), and point E (70, 30, 0) (including segments AB, BC, CD, DE, and EA) in the attached FIG. 5.

A resistive paste according to a third aspect of the present invention further includes a densification promoting oxide that promotes densification of a sintered compact formed by firing the resistive paste and is at least one selected from the group consisting of $Al_2O_3$ and $TiO_2$; and a densification preventing oxide that prevents the densification and is at least one selected from the group consisting of $ZrO_2$ and $ZnO_2$.

Figure 6:
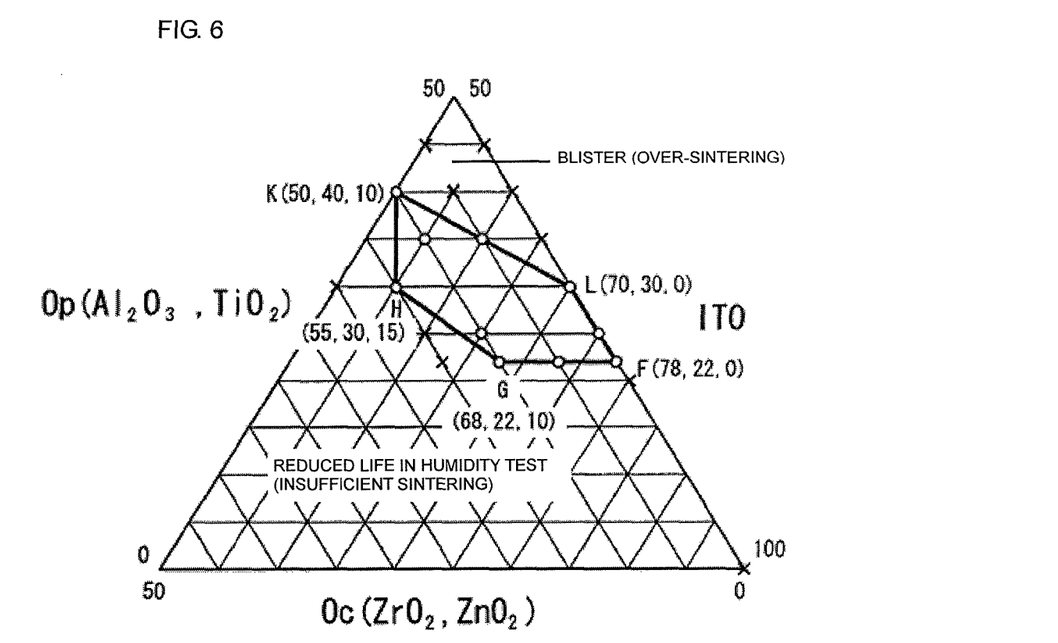
FIG. 6 is a ternary diagram of ITO, a densification promoting oxide Op ($Al_2O_3$, $TiO_2$), and a densification preventing oxide Oc ($ZrO_2$, $ZnO_2$) contained in a resistive paste prepared in Experimental Example 4.

A resistive paste according to a fourth aspect of the present invention further includes a densification promoting oxide (Op) that promotes densification of a sintered compact formed by firing the resistive paste and is at least one selected from the group consisting of $Al_2O_3$ and $TiO_2$; and densification preventing oxide (Oc) that prevents the densification and is at least one selected from the group consisting of $ZrO_2$ and $ZnO_2$, wherein the component ratio (ITO, Op, Oc) of the In—Sn complex oxide (ITO), the densification promoting oxide (Op), and the densification preventing oxide (Oc) on the basis of volume percent is in a range included by a polygon defined by point F (78, 22, 0), point G (68, 22, 10), point H (55, 30, 15), point K (50, 40, 10), and point L (70, 30, 0) (including segments FG, GH, HK, KL, and LF) in the attached FIG. 6.

The resistive paste according to the first or second aspect and the resistive paste according to the third or fourth aspect may be mixed.

The present invention is also directed to a monolithic ceramic capacitor that includes a ceramic laminate formed of a plurality of ceramic layers, internal electrodes disposed in the ceramic laminate, and an external electrode disposed on an outer surface of the ceramic laminate and electrically connected to particular internal electrodes of the internal electrodes.

In a monolithic ceramic capacitor according to the present invention, the external electrode includes a resistive electrode layer and an electroconductive electrode layer disposed on the resistive electrode layer, and the resistive electrode layer is a sintered compact of the resistive paste described above.

Advantages

In a resistive paste according to the present invention, the densification promoting metal or oxide that promotes densification of a sintered compact formed by firing the resistive paste can provide sufficient sintering of the sintered compact, thus improving characteristics such as moisture resistance, and the densification preventing metal or oxide that prevents the densification of the sintered compact can reduce oversintering, thus preventing the occurrence of blisters.

The densification promoting metals Ni and Cu and the densification preventing metals Mo, Cr, and Nb reduce the resistance of the resistive paste, whereas the densification promoting oxide $Al_2O_3$ and $TiO_2$ and the densification preventing oxide $ZrO_2$ and $ZnO_2$ increase the resistance of the resistive paste. Thus, a resistive paste containing a densification promoting or preventing metal and a resistive paste containing a densification promoting or preventing oxide can be mixed to facilitate the control of the specific resistance of a sintered compact formed by firing the mixed resistive paste. Alternatively, a simple paste can be prepared containing the promoting and/or preventing elements.

Consequently, the ESR of a monolithic ceramic capacitor that includes an external electrode including a resistive electrode layer formed of a sintered compact of a resistive paste according to the present invention can be easily controlled.

REFERENCE NUMERALS

| | |
|---|---|
| 1, 11, 21 | monolithic ceramic capacitor |
| 2, 22 | ceramic layer |
| 3, 23 | ceramic laminate |
| 4, 5, 26, 27 | internal electrode |
| 6, 7, 28, 29 | external electrode |
| 8, 30 | resistive electrode layer |
| 9 | plated electrode layer |
| 12 | baked electrode layer |
| 24, 25 | via conductor |
| 31 | electroconductive electrode layer |

BEST MODES FOR CARRYING OUT THE INVENTION

Figure 1:
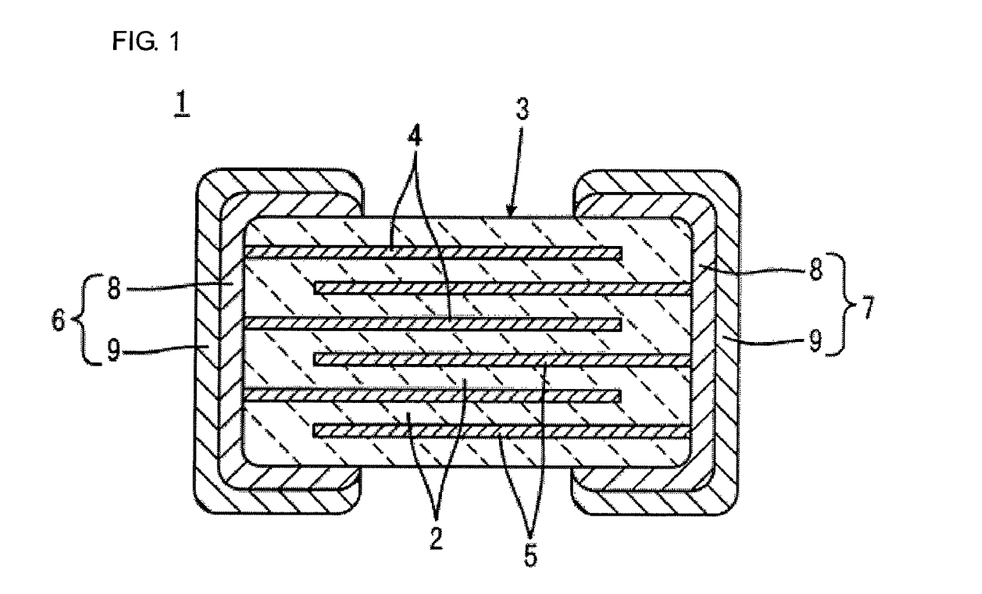
FIG. 1 is a schematic cross-sectional view in the lamination direction of a monolithic ceramic capacitor manufactured using a resistive paste according to a first embodiment of the present invention.

FIG. 1 illustrates a monolithic ceramic capacitor manufactured using a resistive paste according to a first embodiment of the present invention.

The monolithic ceramic capacitor 1 illustrated in FIG. 1 includes a ceramic laminate 3 in the shape of a rectangular parallelepiped, which includes a plurality of ceramic layers 2 each formed of dielectric ceramic. The ceramic laminate 3 includes internal electrodes 4 and 5 between pairs of the ceramic layers 2. The internal electrodes 4 and 5 contain Ni or a Ni alloy as an electroconductive component. The internal electrodes 4 and the internal electrodes 5 are alternately disposed with a ceramic layer 2 interposed therebetween and thereby form capacitors.

External electrodes 6 and 7 are oppositely disposed on the outer surface of the ceramic laminate 3. The external electrode 6 is electrically connected to the internal electrodes 4, and the external electrode 7 is electrically connected to the internal electrodes 5.

In such a monolithic ceramic capacitor 1, each of the external electrodes 6 and 7 includes a resistive electrode layer 8, which is in contact with the ceramic laminate 3 and the internal electrodes 4 or 5, and a plated electrode layer 9 disposed on the resistive electrode layer 8 and serving as an electroconductive electrode layer.

The resistive electrode layer 8 also imparts the function of a resistance element to the external electrodes 6 and 7 and is formed of a sintered compact formed by firing a resistive paste according to the present invention, for example, in a neutral or reducing atmosphere at a temperature of approximately 700° C. A resistive paste according to the present invention will be described in detail below.

The plated electrode layer 9 is formed, for example, by electroplating and preferably includes a Ni plated layer and a Sn or solder plated layer disposed on the Ni plated layer. The plated electrode layer 9 can improve the weatherability of the monolithic ceramic capacitor 1 and impart excellent solderability to the external electrodes 6 and 7 in the installation of the monolithic ceramic capacitor 1.

Figure 2:
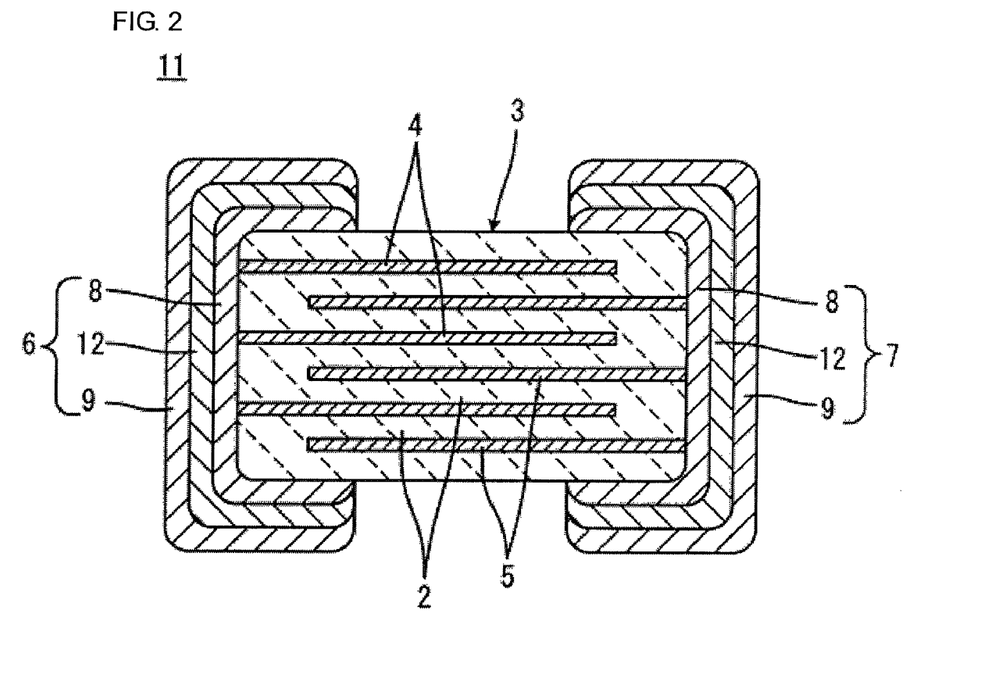
FIG. 2 is a schematic cross-sectional view in the lamination direction of a monolithic ceramic capacitor manufactured using a resistive paste according to a second embodiment of the present invention.

FIG. 2 illustrates a monolithic ceramic capacitor manufactured using a resistive paste according to a second embodiment of the present invention. A monolithic ceramic capacitor 11 illustrated in FIG. 2 includes many of the components of the monolithic ceramic capacitor 1 illustrated in FIG. 1. These components are denoted by the reference numerals used in FIG. 1 and will not be further described.

The monolithic ceramic capacitor 11 illustrated in FIG. 2 is characterized in that each of the external electrodes 6 and 7 further includes a baked electrode layer 12 as an electroconductive electrode layer. The baked electrode layer 12 is disposed in contact with the outer surface of the resistive electrode layer 8 between the resistive electrode layer 8 and the plated electrode layer 9. For example, the baked electrode layer 12 can be formed by applying a paste that contains a metal powder, such as a Cu powder or a Cu alloy powder, a glass frit, and an organic vehicle to the resistive electrode layer 8 and baking the paste.

Preferably, the composition of a glass component in the baked electrode layer 12 is the same as the composition of a glass component in the resistive electrode layer 8. This can stabilize the resistance of the monolithic ceramic capacitor 11 and improve the controllability of the ESR of the monolithic ceramic capacitor 11.

The baked electrode layer 12 can further improve the weatherability of the monolithic ceramic capacitor 11 and impart sufficient plating resistance to the monolithic ceramic capacitor 11 in a plating process for forming the plated electrode layer 9.

In the monolithic ceramic capacitors 1 and 11 described above, the resistive electrode layer 8 is formed of a sintered compact of a resistive paste according to the present invention, as described above. A resistive paste according to the present invention basically contains an In—Sn complex oxide, a glass frit, and an organic vehicle.

The In—Sn complex oxide is an electroconductive component having a predetermined resistance. In general, the In—Sn complex oxide is synthesized by dissolving approximately 1% to 20% by weight of $SnO_2$ in $In_2O_3$. At a percentage of $SnO_2$ below this range, the In—Sn complex oxide has reduced electrical conductivity. At a percentage of $SnO_2$ above this range, heat treatment required to dissolve $SnO_2$ must be performed at high temperature for a long period of time, thus promoting grain growth. Consequently, it takes a long period of time to pulverize grains into a powder.

When a paste containing an $In_2O_3$ powder and a paste containing a $SnO_2$ powder are used in place of a resistive paste that contains an In—Sn complex oxide powder previously synthesized as described above, a solid solution between the $SnO_2$ and the $In_2O_3$ is difficult to obtain at the temperature of approximately 700° C. described above, and thus sufficient electrical conductivity cannot be achieved. The In—Sn complex oxide should therefore be previously heat-treated at a high temperature to achieve sufficient solid solution.

Preferably, the volume ratio of the In—Sn complex oxide powder to the glass frit in the resistive paste ranges from 30:70 to 70:30. An excessively low content of the glass frit results in poor adhesion between In—Sn complex oxide particles, leading to a loss of the resistive electrode layer 8. An excessively high content of the glass frit results in glass flow during firing, leading to a deformation of the resistive electrode layer 8. Because the glass component functions as an electrical insulating component, the content of the glass frit can be altered within the range described above to control the resistance of the resistive electrode layer 8 and consequently to control the ESR of the monolithic ceramic capacitor 1.

A resistive paste in the first embodiment further contains a densification promoting metal and a densification preventing metal in place of part of the In—Sn complex oxide. A resistive paste in the second embodiment further contains a densification promoting oxide and a densification preventing oxide in place of part of the In—Sn complex oxide.

The densification promoting metal or oxide promotes densification of a sintered compact formed by firing the resistive paste. The densification promoting metal is at least one selected from the group consisting of Ni and Cu. The densification promoting oxide is at least one selected from the group consisting of $Al_2O_3$ and $TiO_2$.

In contrast, the densification preventing metal or oxide prevents densification of a sintered compact formed by firing the resistive paste. The densification preventing metal is at least one selected from the group consisting of Mo, Cr, and Nb. The densification preventing oxide is at least one selected from the group consisting of $ZrO_2$ and $ZnO_2$.

Preferably, the contents of the densification promoting metal and the densification preventing metal in the resistive paste according to the first embodiment are determined as described below. The densification promoting metal and the densification preventing metal are contained such that the component ratio (ITO, Mp, Mc) of the In—Sn complex oxide (ITO), the densification promoting metal (Mp), and the densification preventing metal (Mc) on the basis of volume percent is in a range included by a polygon defined by point A (95, 5, 0), point B (92.5, 5, 2.5), point C (55, 30, 15), point D (50, 40, 10), and point E (70, 30, 0) (including segments AB, BC, CD, DE, and EA) in the attached FIG. 5. As shown by the component ratio on the segment EA in FIG. 5, it should be noted that the densification preventing metal may be absent at certain particular contents of the densification promoting metal.

Preferably, the contents of the densification promoting oxide and the densification preventing oxide in the resistive paste according to the second embodiment are determined as described below. The densification promoting oxide and the densification preventing oxide are contained such that the component ratio (ITO, Op, Oc) of the In—Sn complex oxide (ITO), the densification promoting oxide (Op), and the densification preventing oxide (Oc) on the basis of volume percent is in a range included by a polygon defined by point F (78, 22, 0), point G (68, 22, 10), point H (55, 30, 15), point K (50, 40, 10), and point L (70, 30, 0) (including segments FG, GH, HK, KL, and LF) in the attached FIG. 6. As shown by the component ratio on the segment LF in FIG. 6, it will be noted that the densification preventing oxide may be absent for particular contents of the densification promoting oxide.

In a resistive paste according to the present invention, the densification promoting metal or oxide can provide sufficient sintering of a sintered compact, thus improving characteristics such as moisture resistance, and the densification preventing metal or oxide can reduce over-sintering caused by the densification promoting metal or oxide, thus preventing the occurrence of blisters.

The densification promoting metal and the densification preventing metal reduce the resistance of a resistive paste, whereas the densification promoting oxide and the densification preventing oxide increase the resistance of the resistive paste. Thus, the resistive paste according to the first embodiment that contains the densification promoting or preventing metal and the resistive paste according to the second embodiment that contains the densification promoting or preventing oxide can be mixed to facilitate the control of the specific resistance of a sintered compact formed by firing the mixed resistive paste.

In the monolithic ceramic capacitors 1 and 11 illustrated in FIGS. 1 and 2, with the resistive electrode layer 8 formed of a sintered compact of such a mixed resistive paste as described above, the ESR of the monolithic ceramic capacitors 1 and 11 can be easily controlled.

While the embodiments of the present invention have been described with reference to the drawings, various modifications may be made without departing from the scope of the present invention.

For example, an additional conductive layer in contact with the ceramic laminate 3 and the internal electrodes 4 or 5 may be formed, and the resistive electrode layer 8 may be formed in contact with the outer surface of the conductive layer in each of the external electrodes 6 and 7. Preferably, the conductive layer is mainly composed of a metal that is reactive to a metal contained in the internal electrodes 4 and 5. In the case that the internal electrodes 4 and 5 contain Ni or a Ni alloy, the main component metal of the conductive layer is preferably Ni and/or Cu.

While FIGS. 1 and 2 are schematic cross-sectional views of the monolithic ceramic capacitor 1 and 11 in the lamination direction, whether the external electrodes 6 and 7 are formed on the short sides or the long sides of the ceramic laminate 3 as viewed from the top is not indicated. Nevertheless, the present invention can be applied to a monolithic ceramic capacitor including the external electrodes 6 and 7 formed on the short sides or the long sides of the ceramic laminate 3.

Figures 3A, 3B:
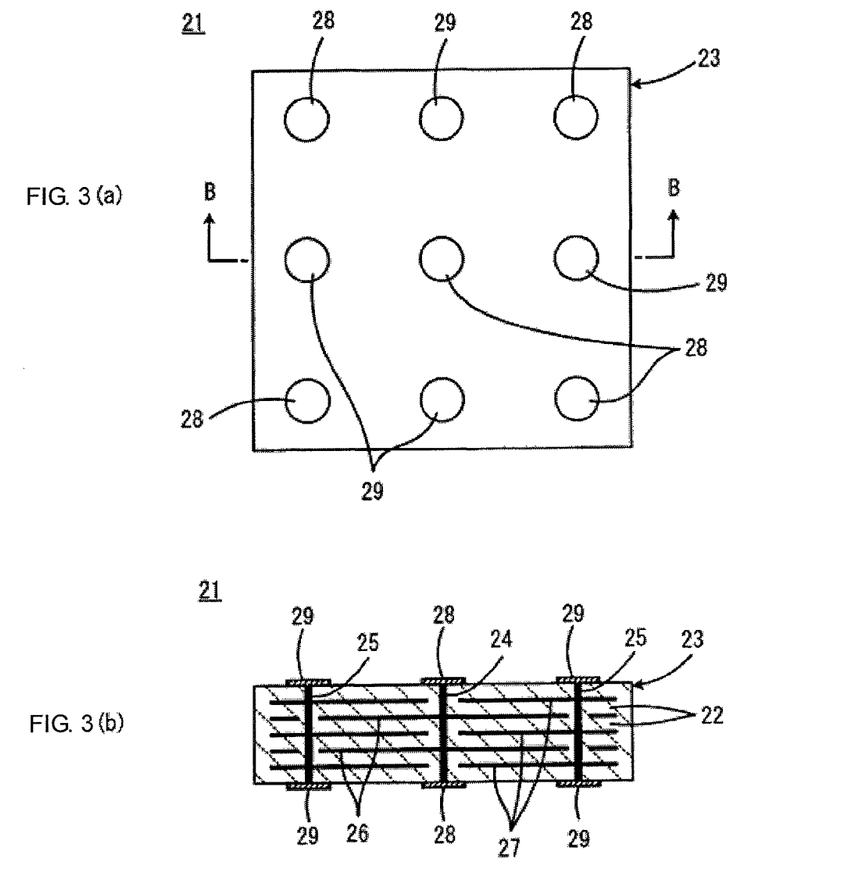
FIG. 3(a) is a top view of a via-array monolithic ceramic capacitor 21 manufactured using a resistive paste according to a third embodiment of the present invention.
FIG. 3(b) is a cross-sectional view along the line B-B in FIG. 3(a).
Figure 4:
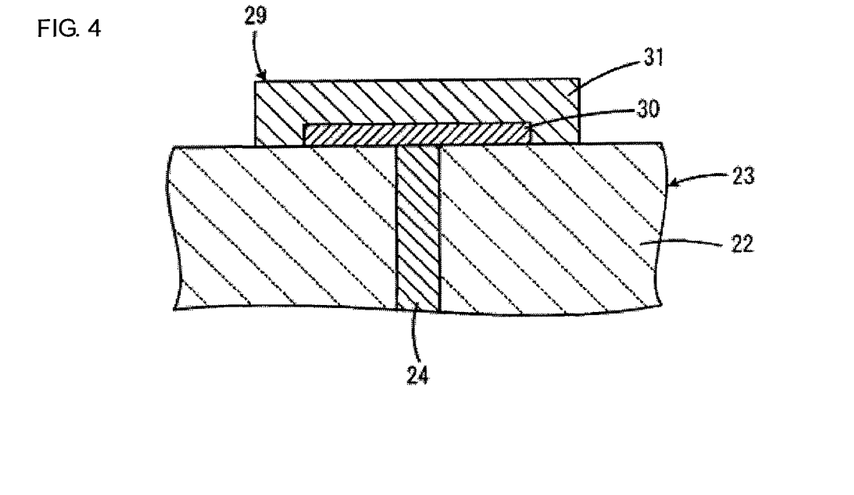
FIG. 4 is an enlarged view of a portion of the via-array monolithic ceramic capacitor 21 illustrated in FIG. 3(b).

The present invention can also be applied to a via-array monolithic ceramic capacitor. FIGS. 3(a), 3(b) and 4 illustrate a via-array monolithic ceramic capacitor 21 as a third embodiment of a monolithic ceramic capacitor manufactured using a resistive paste according to the present invention. FIG. 3(a) is a top view of a monolithic ceramic capacitor 21, and FIG. 3(b) is a cross-sectional view along the line B-B in FIG. 3(a). FIG. 4 is an enlarged view of a portion of the via-array monolithic ceramic capacitor 21 illustrated in FIG. 3(b).

The monolithic ceramic capacitor 21 includes a ceramic laminate 23 in the shape of a rectangular parallelepiped, more specifically a regular quadrangular prism, which includes a plurality of ceramic layers 22 each formed of dielectric ceramic. The ceramic laminate 23 includes first and second via conductors 24 and 25, which pass through the ceramic laminate 23 in the lamination direction, and first and second internal electrodes 26 and 27 between ceramic layers 22.

The first internal electrodes 26 and the second internal electrodes 27 are alternately disposed with a ceramic layer 22 interposed therebetween and thereby form capacitors. The first via conductors 24 are electrically connected to the first internal electrodes 26 but are electrically insulated from the second internal electrodes 27. The second via conductors 25 are electrically connected to the second internal electrodes 27 but are electrically insulated from the first internal electrodes 26.

The via conductors 24 and 25 and the internal electrodes 26 and 27 can contain Ni or a Ni alloy as an electroconductive component.

The ceramic laminate 23 further includes a plurality of first and second external electrodes 28 and 29 on the top and bottom surfaces thereof. The first external electrodes 28 are electrically connected to the first via conductors 24, and the second external electrodes 29 are electrically connected to the second via conductors 25. Consequently, the first external electrodes 28 are electrically connected to the first internal electrodes 26, and the second external electrodes 29 are electrically connected to the second internal electrodes 27. As illustrated in FIGS. 3(a) and 3(b), the first and second external electrodes 28 and 29 are adjacent to each other on the top and bottom surfaces of the ceramic laminate 23.

In such a via-array monolithic ceramic capacitor 21, as shown by a first external electrode 28 illustrated in FIG. 4, each of the first and second external electrodes 28 and 29 includes a resistive electrode layer 30 in contact with a ceramic laminate 23 and a via conductor 24 or 25, and an electroconductive electrode layer 31 formed on the resistive electrode layer 30.

The resistive electrode layer 30 is formed of a sintered compact formed by firing a resistive paste according to the present invention. The electroconductive electrode layer 31 may be formed of a plated electrode layer, a baked electrode layer, or a baked electrode layer and a plated electrode layer formed on the baked electrode layer.

Such a via-array monolithic ceramic capacitor 21 can be manufactured as described below.

First, a ceramic green sheet to be formed into the ceramic layers 22 and an electroconductive paste used to form the via conductors 24 and 25 and the internal electrodes 26 and 27 are prepared.

The electroconductive paste is then printed on ceramic green sheets, for example, by screen printing to form an electroconductive paste film which is to become the internal electrodes 26 and 27.

A predetermined number of ceramic green sheets on which the electroconductive paste film was printed are then stacked. On one side of the laminate of ceramic green sheets, a predetermined number of ceramic green sheets on which the electroconductive paste film is not printed are stacked as an outer layer. If necessary, on the other side of the laminate, ceramic green sheets are stacked as an outer layer. Through these steps, a green mother laminate has been formed. If necessary, the green mother laminate is pressed in the lamination direction, for example, by isostatic pressing.

Through-holes passing through the mother laminate in the lamination direction are then formed, for example, with a laser or NC punch. The through-holes are filled with an electroconductive paste, which is to become the via conductors 24 and 25, by a method such as screen printing.

The green mother laminate thus formed is then cut into a green ceramic laminate 23 having a predetermined size. The green ceramic laminate 23 is then fired.

After firing, a resistive paste according to the present invention is printed on the top and bottom surfaces of the ceramic laminate 23 by a method such as screen printing to cover the via conductors 24 and 25 and is then baked to form the resistive electrode layers 30, which serve as bases of the first and second external electrodes 28 and 29.

In the case that the electroconductive electrode layers 31 are formed of baked electrodes, an electroconductive paste is printed on the resistive electrode layers 30 by a method such as screen printing and is baked to form the electroconductive electrode layers 31. If necessary, a plated electrode layer may be subsequently formed. In the case that the electroconductive electrode layers 31 are formed of plated electrodes, the resistive electrode layers 30 are plated to form the electroconductive electrode layers 31.

Experimental Examples of the present invention will be described below to illustrate the scope of the present invention and prove the advantages of the present invention.

Common Conditions

Before Experimental Examples 1 to 5 are described, the conditions common to Experimental Examples 1 to 5 are described below.

In Experimental Examples 1 to 5, a monolithic ceramic capacitor having a structure illustrated in FIG. 2 was prepared.

First, a ceramic laminate that included internal electrodes containing Ni and was used for a monolithic ceramic capacitor having a design capacitance of 1 µF was prepared by a known method. The ceramic laminate included 115 ceramic layers and had a width of 1600 µm and a thickness of 450 µm. Each of the internal electrodes had a width of 1300 µm and a thickness of 1 µm. External electrodes of a monolithic ceramic capacitor according to these Experimental Examples were formed on the long sides (the length of which corresponded to the width) of the ceramic laminate in a coating process described below.

The pastes used to form a resistive electrode layer were prepared as described below.

A $SnO_2$ powder was mixed with an $In_2O_3$ powder such that the amount of the $SnO_2$ powder was 5% by weight of the total amount of the $In_2O_3$ powder and the $SnO_2$ powder. The mixture was calcined in the atmosphere at a temperature of 1400° C. for 5 hours to sufficiently dissolve $SnO_2$ and was ground to prepare an In—Sn complex oxide (ITO) powder having an average particle size of approximately 1 µm.

A glass frit that was formed of B—Si—Zn—Ba—Ca—Al glass and had a glass softening point of approximately 560° C. and an average particle size of approximately 1 µm was prepared.

An organic vehicle containing 20% by weight of acrylic resin was then mixed with the ITO powder and the glass frit thus prepared and was dispersed with a rolling mill to prepare a paste used for a resistive electrode layer. The volume ratio of (ITO powder):(glass frit):(organic vehicle) in the paste was 12.5:12.5:75. When the organic vehicle in the paste is excluded, the volume ratio of (ITO powder):(glass frit) was 50:50, and the weight ratio of (ITO powder):(glass frit) was 70:30.

The paste used for a resistive electrode layer described above had a basic composition without a densification promoting metal or oxide or a densification preventing metal or oxide. In pastes used for a resistive electrode layer in Experimental Examples described below, part of the ITO powder was substituted by a densification promoting metal or oxide powder or a densification preventing metal or oxide powder each having an average particle size of approximately 1 µm.

The paste used for a resistive electrode layer was then applied to ends of the ceramic laminate by a dip method and was dried at a temperature of 150° C. for 10 minutes. The dry film thickness was approximately 30 µm.

The ceramic laminate on which the paste used for a resistive electrode layer was dried was heat-treated in a $N_2$ atmosphere (oxygen content: 10 ppm or less) at a maximum temperature of 700° C. for 15 minutes in a continuous belt furnace to form a resistive electrode layer.

A known Cu paste that contains a Cu powder, a glass frit, and an organic vehicle was used to form a baked electrode layer on the resistive electrode layer by baking. The baked electrode layer was then plated with Ni and Sn to form a plated electrode layer, completing a monolithic ceramic capacitor. The glass frit in the paste used for a baked electrode layer was the same as the glass frit in the paste used for a resistive electrode layer.

The ESR of the monolithic ceramic capacitor thus manufactured was measured. The incidence of blister was determined by polishing the cross section of the monolithic ceramic capacitor and inspecting the cross section for pores having a minor axis of 10 µm or more, which indicated the occurrence of blisters, in the resistive electrode layer. The relative density of the resistive electrode layer in the monolithic ceramic capacitor, i.e., the density relative to [specify], was determined. The monolithic ceramic capacitor was subjected to a humidity test at a temperature of 85° C., a relative humidity of 90%, and an applied voltage of 5 V. The elapsed time during which the insulation resistance decreased from the initial insulation resistance by one order of magnitude was considered as the life.

The ESR, the relative density of the resistive electrode layer, and the life in the humidity test reported are mean values of several tens of monolithic ceramic capacitors. The incidence of blister was determined as the percentage of monolithic ceramic capacitors having blisters in several tens of monolithic ceramic capacitors.

Experimental Example 1

In Experimental Example 1, part of ITO in a resistive paste was substituted by Ni, Cu, Mo, Nb, or Cr, as shown in Table 1.

TABLE 1

| Substitute metal species | Substitution rate (volume %) | ESR (mΩ) | Incidence of blister (%) | Relative density of resistive electrode layer (%) | Life in humidity test (hours) |
|---|---|---|---|---|---|
| No substitution | — | 145 | 0 | 74 | 760 |
| Ni | 5 | 101 | 0 | 82 | >1000 |
|  | 10 | 63 | 0 | 86 | >1000 |
|  | 20 | 45 | 0 | 88 | >1000 |
|  | 30 | 30 | 0 | 89 | >1000 |
|  | 35 | — | 30 | — | — |
|  | 40 | — | 40 | — | — |
| Cu | 5 | 108 | 0 | 85 | >1000 |
|  | 10 | 98 | 0 | 86 | >1000 |
|  | 20 | 53 | 0 | 89 | >1000 |
|  | 30 | 33 | 0 | 90 | >1000 |
|  | 35 | — | 80 | — | — |
|  | 40 | — | 100 | — | — |
| Mo | 5 | 123 | 0 | 73 | 735 |
|  | 10 | 118 | 0 | 72 | 720 |
|  | 20 | 73 | 0 | 70 | 690 |
|  | 30 | 52 | 0 | 69 | 483 |
|  | 35 | 43 | 0 | 67 | 403 |
|  | 40 | 35 | 0 | 65 | 320 |
| Nb | 5 | 119 | 0 | 74 | 712 |
|  | 10 | 92 | 0 | 71 | 663 |
|  | 20 | 70 | 0 | 70 | 632 |
|  | 30 | 49 | 0 | 68 | 401 |
|  | 35 | 39 | 0 | 67 | 310 |
|  | 40 | 31 | 0 | 63 | 220 |
| Cr | 5 | 123 | 0 | 71 | 580 |
|  | 10 | 109 | 0 | 69 | 403 |
|  | 20 | 59 | 0 | 68 | 298 |
|  | 30 | 36 | 0 | 65 | 220 |
|  | 35 | 25 | 0 | 63 | 220 |
|  | 40 | 22 | 0 | 61 | 188 |

Table 1 shows that the substitution of Ni, Cu, Mo, Nb, or Cr for part of ITO can reduce the ESR with an increase in substitution rate. The relative density of the resistive electrode layer shows that Ni and Cu promote the densification of the resistive electrode layer, and Mo, Nb, and Cr prevent the densification of the resistive electrode layer. At a substitution rate of the densification promoting Ni or Cu in the range of 5% to 30% by volume, the monolithic ceramic capacitor had no blistering and had high reliability in the humidity test.

Experimental Example 2

In Experimental Example 2, part of ITO in a resistive paste was substituted by $Al_2O_3$, $TiO_2$, $ZrO_2$, or $ZnO_2$, as shown in Table 2.

TABLE 2

| Substitute metal species | Substitution rate (volume %) | ESR (mΩ) | Incidence of blister (%) | Relative density of resistive electrode layer (%) | Life in humidity test (hours) |
|---|---|---|---|---|---|
| No substitution | — | 145 | 0 | 74 | 760 |
| $Al_2O_3$ | 10 | 198 | 0 | 76 | 880 |
|  | 20 | 258 | 0 | 79 | 959 |
|  | 22 | 280 | 0 | 86 | >1000 |
|  | 30 | 493 | 0 | 90 | >1000 |
|  | 35 | — | 100 | — | — |
|  | 40 | — | 100 | — | — |
| $TiO_2$ | 10 | 233 | 0 | 75 | 850 |
|  | 20 | 328 | 0 | 79 | 972 |
|  | 22 | 369 | 0 | 83 | >1000 |
|  | 30 | 703 | 0 | 85 | >1000 |
|  | 35 | — | 90 | — | — |
|  | 40 | — | 100 | — | — |
| $ZrO_2$ | 10 | 293 | 0 | 73 | 703 |
|  | 20 | 805 | 0 | 72 | 651 |
|  | 22 | 1020 | 0 | 70 | 650 |
|  | 30 | 2912 | 0 | 67 | 380 |
|  | 35 | 4225 | 0 | 62 | 233 |
|  | 40 | 5023 | 0 | 60 | 152 |
| $ZnO_2$ | 10 | 188 | 0 | 72 | 710 |
|  | 20 | 250 | 0 | 71 | 603 |
|  | 22 | 322 | 0 | 67 | 388 |
|  | 30 | 1170 | 0 | 65 | 255 |
|  | 35 | 2433 | 0 | 63 | 125 |
|  | 40 | 3569 | 0 | 61 | 80 |

Table 2 shows that the substitution of $Al_2O_3$, $TiO_2$, $ZrO_2$, or $ZnO_2$ for part of ITO can reduce the ESR with an increase in substitution rate. The relative density of the resistive electrode layer shows that $Al_2O_3$ and $TiO_2$ promote the densification of the resistive electrode layer, and $ZrO_2$ and $ZnO_2$ prevent the densification of the resistive electrode layer. At a substitution rate of the densification promoting $Al_2O_3$ and $TiO_2$ in the range of 22% to 30% by volume, the monolithic ceramic capacitor had no blisters and had high reliability in the humidity test.

Experimental Example 3

In Experimental Example 3, as shown in Tables 3 to 8, part of ITO in a resistive paste was substituted by densification promoting metals Ni and Cu and densification preventing metals Mo, Cr, and Nb evaluated in Experimental Example 1 to control the densification.

The total substitution rate of the densification promoting metal and the densification preventing metal ranged from 5% to 50% by volume. This is because the substitute metal component is predominant at a total substitution rate above 50% by volume, and the resistive paste does not retain its original function.

TABLE 3

| Sample number | Densification promoting metal species and substitution rate | | Densification preventing metal species and substitution rate | | ITO percentage (volume %) | ESR (mΩ) | Incidence of blister (%) | Relative density of resistive electrode layer (%) | Life in humidity test (hours) | Overall judgment |
|---|---|---|---|---|---|---|---|---|---|---|
| | Species | Volume % | Species | Volume % | | | | | | |
| 1-1 | Ni | 5 | Mo | 0 | 95 | 101 | 0 | 82 | >1000 | Pass |
| 1-2 | Ni | 5 | Mo | 2.5 | 92.5 | 83 | 0 | 80 | >1000 | Pass |
| 1-3 | Ni | 5 | Mo | 5 | 90 | 65 | 0 | 75 | 752 | Fail |
| 1-4 | Ni | 10 | Mo | 0 | 90 | 63 | 0 | 86 | >1000 | Pass |
| 1-5 | Ni | 10 | Mo | 5 | 85 | 53 | 0 | 83 | >1000 | Pass |
| 1-6 | Ni | 10 | Mo | 10 | 80 | 50 | 0 | 78 | 755 | Fail |
| 1-7 | Ni | 20 | Mo | 0 | 80 | 45 | 0 | 88 | >1000 | Pass |
| 1-8 | Ni | 20 | Mo | 5 | 75 | 37 | 0 | 86 | >1000 | Pass |
| 1-9 | Ni | 20 | Mo | 10 | 70 | 31 | 0 | 83 | >1000 | Pass |
| 1-10 | Ni | 20 | Mo | 15 | 65 | 28 | 0 | 77 | 582 | Fail |
| 1-11 | Ni | 30 | Mo | 0 | 70 | 30 | 0 | 89 | >1000 | Pass |
| 1-12 | Ni | 30 | Mo | 15 | 55 | 23 | 0 | 81 | >1000 | Pass |
| 1-13 | Ni | 30 | Mo | 20 | 50 | 16 | 0 | 75 | 463 | Fail |
| 1-14 | Ni | 35 | Mo | 0 | 65 | — | 30 | — | — | Fail |
| 1-15 | Ni | 35 | Mo | 5 | 60 | 29 | 0 | 88 | >1000 | Pass |
| 1-16 | Ni | 35 | Mo | 10 | 55 | 20 | 0 | 85 | >1000 | Pass |
| 1-17 | Ni | 40 | Mo | 0 | 60 | — | 40 | — | — | Fail |
| 1-18 | Ni | 40 | Mo | 5 | 55 | — | 20 | — | — | Fail |
| 1-19 | Ni | 40 | Mo | 10 | 50 | 12 | 0 | 93 | >1000 | Pass |
| 1-20 | Ni | 45 | Mo | 0 | 55 | — | 100 | — | — | Fail |
| 1-21 | Ni | 45 | Mo | 5 | 50 | — | 70 | — | — | Fail |

TABLE 4

| Sample number | Densification promoting metal species and substitution rate Species | Volume % | Densification preventing metal species and substitution rate Species | Volume % | ITO percentage (volume %) | ESR (mΩ) | Incidence of blister (%) | Relative density of resistive electrode layer (%) | Life in humidity test (hours) | Overall judgment |
|---|---|---|---|---|---|---|---|---|---|---|
| 2-1 | Ni | 5 | Nb | 0 | 95 | 101 | 0 | 82 | >1000 | Pass |
| 2-2 | Ni | 5 | Nb | 2.5 | 92.5 | 75 | 0 | 82 | >1000 | Pass |
| 2-3 | Ni | 5 | Nb | 5 | 90 | 60 | 0 | 77 | 851 | Fail |
| 2-4 | Ni | 10 | Nb | 0 | 90 | 63 | 0 | 87 | >1000 | Pass |
| 2-5 | Ni | 10 | Nb | 5 | 85 | 50 | 0 | 85 | >1000 | Pass |
| 2-6 | Ni | 10 | Nb | 10 | 80 | 48 | 0 | 79 | 902 | Fail |
| 2-7 | Ni | 20 | Nb | 0 | 80 | 45 | 0 | 88 | >1000 | Pass |
| 2-8 | Ni | 20 | Nb | 5 | 75 | 35 | 0 | 85 | >1000 | Pass |
| 2-9 | Ni | 20 | Nb | 10 | 70 | 30 | 0 | 84 | >1000 | Pass |
| 2-10 | Ni | 20 | Nb | 15 | 65 | 25 | 0 | 79 | 888 | Fail |
| 2-11 | Ni | 30 | Nb | 0 | 70 | 30 | 0 | 89 | >1000 | Pass |
| 2-12 | Ni | 30 | Nb | 15 | 55 | 20 | 0 | 82 | >1000 | Pass |
| 2-13 | Ni | 30 | Nb | 20 | 50 | 13 | 0 | 76 | 651 | Fail |
| 2-14 | Ni | 35 | Nb | 0 | 65 | — | 30 | — | — | Fail |
| 2-15 | Ni | 35 | Nb | 5 | 60 | 26 | 0 | 90 | >1000 | Pass |
| 2-16 | Ni | 35 | Nb | 10 | 55 | 18 | 0 | 85 | >1000 | Pass |
| 2-17 | Ni | 40 | Nb | 0 | 60 | — | 40 | — | — | Fail |
| 2-18 | Ni | 40 | Nb | 5 | 55 | 9 | 30 | — | — | Fail |
| 2-19 | Ni | 40 | Nb | 10 | 50 | — | 0 | 92 | >1000 | Pass |
| 2-20 | Ni | 45 | Nb | 0 | 55 | — | 100 | — | — | Fail |
| 2-21 | Ni | 45 | Nb | 5 | 50 | — | 90 | — | — | Fail |

TABLE 5

| Sample number | Densification promoting metal species and substitution rate Species | Volume % | Densification preventing metal species and substitution rate Species | Volume % | ITO percentage (volume %) | ESR (mΩ) | Incidence of blister (%) | Relative density of resistive electrode layer (%) | Life in humidity test (hours) | Overall judgment |
|---|---|---|---|---|---|---|---|---|---|---|
| 3-1 | Ni | 5 | Cr | 0 | 95 | 101 | 0 | 82 | >1000 | Pass |
| 3-2 | Ni | 5 | Cr | 2.5 | 92.5 | 78 | 0 | 80 | >1000 | Pass |
| 3-3 | Ni | 5 | Cr | 5 | 90 | 75 | 0 | 70 | 586 | Fail |
| 3-4 | Ni | 10 | Cr | 0 | 90 | 63 | 0 | 87 | >1000 | Pass |
| 3-5 | Ni | 10 | Cr | 5 | 85 | 58 | 0 | 83 | >1000 | Pass |
| 3-6 | Ni | 10 | Cr | 10 | 80 | 51 | 0 | 73 | 622 | Fail |
| 3-7 | Ni | 20 | Cr | 0 | 80 | 45 | 0 | 88 | >1000 | Pass |
| 3-8 | Ni | 20 | Cr | 5 | 75 | 38 | 0 | 85 | >1000 | Pass |
| 3-9 | Ni | 20 | Cr | 10 | 70 | 35 | 0 | 81 | >1000 | Pass |
| 3-10 | Ni | 20 | Cr | 15 | 65 | 28 | 0 | 76 | 682 | Fail |
| 3-11 | Ni | 30 | Cr | 0 | 70 | 30 | 0 | 89 | >1000 | Pass |
| 3-12 | Ni | 30 | Cr | 15 | 55 | 25 | 0 | 85 | >1000 | Pass |
| 3-13 | Ni | 30 | Cr | 20 | 50 | 20 | 0 | 78 | 863 | Fail |
| 3-14 | Ni | 35 | Cr | 0 | 65 | — | 30 | — | — | Fail |
| 3-15 | Ni | 35 | Cr | 5 | 60 | 28 | 0 | 91 | >1000 | Pass |
| 3-16 | Ni | 35 | Cr | 10 | 55 | 22 | 0 | 86 | >1000 | Pass |
| 3-17 | Ni | 40 | Cr | 0 | 60 | — | 40 | — | — | Fail |
| 3-18 | Ni | 40 | Cr | 5 | 55 | 15 | 40 | — | — | Fail |
| 3-19 | Ni | 40 | Cr | 10 | 50 | — | 0 | 93 | >1000 | Pass |
| 3-20 | Ni | 45 | Cr | 0 | 55 | — | 100 | — | — | Fail |
| 3-21 | Ni | 45 | Cr | 5 | 50 | — | 100 | — | — | Fail |

TABLE 6

| Sample number | Densification promoting metal species and substitution rate Species | Volume % | Densification preventing metal species and substitution rate Species | Volume % | ITO percentage (volume %) | ESR (mΩ) | Incidence of blister (%) | Relative density of resistive electrode layer (%) | Life in humidity test (hours) | Overall judgment |
|---|---|---|---|---|---|---|---|---|---|---|
| 4-1 | Cu | 5 | Mo | 0 | 95 | 108 | 0 | 85 | >1000 | Pass |
| 4-2 | Cu | 5 | Mo | 2.5 | 92.5 | 92 | 0 | 83 | >1000 | Pass |

TABLE 6-continued

| Sample number | Densification promoting metal species and substitution rate | | Densification preventing metal species and substitution rate | | ITO percentage (volume %) | ESR (mΩ) | Incidence of blister (%) | Relative density of resistive electrode layer (%) | Life in humidity test (hours) | Overall judgment |
|---|---|---|---|---|---|---|---|---|---|---|
| | Species | Volume % | Species | Volume % | | | | | | |
| 4-3 | Cu | 5 | Mo | 5 | 90 | 72 | 0 | 78 | 883 | Fail |
| 4-4 | Cu | 10 | Mo | 0 | 90 | 98 | 0 | 86 | >1000 | Pass |
| 4-5 | Cu | 10 | Mo | 5 | 85 | 85 | 0 | 82 | >1000 | Pass |
| 4-6 | Cu | 10 | Mo | 10 | 80 | 78 | 0 | 78 | 816 | Fail |
| 4-7 | Cu | 20 | Mo | 0 | 80 | 53 | 0 | 89 | >1000 | Pass |
| 4-8 | Cu | 20 | Mo | 5 | 75 | 48 | 0 | 88 | >1000 | Pass |
| 4-9 | Cu | 20 | Mo | 10 | 70 | 45 | 0 | 82 | >1000 | Pass |
| 4-10 | Cu | 20 | Mo | 15 | 65 | 32 | 0 | 73 | 668 | Fail |
| 4-11 | Cu | 30 | Mo | 0 | 70 | 33 | 0 | 90 | >1000 | Pass |
| 4-12 | Cu | 30 | Mo | 15 | 55 | 27 | 0 | 84 | >1000 | Pass |
| 4-13 | Cu | 30 | Mo | 20 | 50 | 26 | 0 | 70 | 580 | Fail |
| 4-14 | Cu | 35 | Mo | 0 | 65 | — | 80 | — | — | Fail |
| 4-15 | Cu | 35 | Mo | 5 | 60 | 35 | 0 | 89 | >1000 | Pass |
| 4-16 | Cu | 35 | Mo | 10 | 55 | 27 | 0 | 84 | >1000 | Pass |
| 4-17 | Cu | 40 | Mo | 0 | 60 | — | 40 | — | — | Fail |
| 4-18 | Cu | 40 | Mo | 5 | 55 | — | 80 | — | — | Fail |
| 4-19 | Cu | 40 | Mo | 10 | 50 | 15 | 0 | 90 | >1000 | Pass |
| 4-20 | Cu | 45 | Mo | 0 | 55 | — | 100 | — | — | Fail |
| 4-21 | Cu | 45 | Mo | 5 | 50 | — | 100 | — | — | Fail |

TABLE 7

| Sample number | Densification promoting metal species and substitution rate | | Densification preventing metal species and substitution rate | | ITO percentage (volume %) | ESR (mΩ) | Incidence of blister (%) | Relative density of resistive electrode layer (%) | Life in humidity test (hours) | Overall judgment |
|---|---|---|---|---|---|---|---|---|---|---|
| | Species | Volume % | Species | Volume % | | | | | | |
| 5-1 | Cu | 5 | Nb | 0 | 95 | 108 | 0 | 85 | >1000 | Pass |
| 5-2 | Cu | 5 | Nb | 2.5 | 92.5 | 90 | 0 | 82 | >1000 | Pass |
| 5-3 | Cu | 5 | Nb | 5 | 90 | 70 | 0 | 73 | 701 | Fail |
| 5-4 | Cu | 10 | Nb | 0 | 90 | 98 | 0 | 86 | >1000 | Pass |
| 5-5 | Cu | 10 | Nb | 5 | 85 | 83 | 0 | 82 | >1000 | Pass |
| 5-6 | Cu | 10 | Nb | 10 | 80 | 72 | 0 | 74 | 755 | Fail |
| 5-7 | Cu | 20 | Nb | 0 | 80 | 53 | 0 | 89 | >1000 | Pass |
| 5-8 | Cu | 20 | Nb | 5 | 75 | 45 | 0 | 86 | >1000 | Pass |
| 5-9 | Cu | 20 | Nb | 10 | 70 | 41 | 0 | 81 | >1000 | Pass |
| 5-10 | Cu | 20 | Nb | 15 | 65 | 36 | 0 | 73 | 552 | Fail |
| 5-11 | Cu | 30 | Nb | 0 | 70 | 33 | 0 | 90 | >1000 | Pass |
| 5-12 | Cu | 30 | Nb | 15 | 55 | 30 | 0 | 85 | >1000 | Pass |
| 5-13 | Cu | 30 | Nb | 20 | 50 | 22 | 0 | 70 | 518 | Fail |
| 5-14 | Cu | 35 | Nb | 0 | 65 | — | 80 | — | — | Fail |
| 5-15 | Cu | 35 | Nb | 5 | 60 | 39 | 0 | 92 | >1000 | Pass |
| 5-16 | Cu | 35 | Nb | 10 | 55 | 33 | 0 | 84 | >1000 | Pass |
| 5-17 | Cu | 40 | Nb | 0 | 60 | — | 40 | — | — | Fail |
| 5-18 | Cu | 40 | Nb | 5 | 55 | — | 70 | — | — | Fail |
| 5-19 | Cu | 40 | Nb | 10 | 50 | 18 | 0 | 90 | >1000 | Pass |
| 5-20 | Cu | 45 | Nb | 0 | 55 | — | 100 | — | — | Fail |
| 5-21 | Cu | 45 | Nb | 5 | 50 | — | 100 | — | — | Fail |

TABLE 8

| Sample number | Densification promoting metal species and substitution rate | | Densification preventing metal species and substitution rate | | ITO percentage (volume %) | ESR (mΩ) | Incidence of blister (%) | Relative density of resistive electrode layer (%) | Life in humidity test (hours) | Overall judgment |
|---|---|---|---|---|---|---|---|---|---|---|
| | Species | Volume % | Species | Volume % | | | | | | |
| 6-1 | Cu | 5 | Cr | 0 | 95 | 108 | 0 | 85 | >1000 | Pass |
| 6-2 | Cu | 5 | Cr | 2.5 | 92.5 | 95 | 0 | 83 | >1000 | Pass |
| 6-3 | Cu | 5 | Cr | 5 | 90 | 73 | 0 | 79 | 805 | Fail |
| 6-4 | Cu | 10 | Cr | 0 | 90 | 98 | 0 | 86 | >1000 | Pass |

TABLE 8-continued

| Sample number | Densification promoting metal species and substitution rate | | Densification preventing metal species and substitution rate | | ITO percentage (volume %) | ESR (mΩ) | Incidence of blister (%) | Relative density of resistive electrode layer (%) | Life in humidity test (hours) | Overall judgment |
|---|---|---|---|---|---|---|---|---|---|---|
| | Species | Volume % | Species | Volume % | | | | | | |
| 6-5 | Cu | 10 | Cr | 5 | 85 | 85 | 0 | 82 | >1000 | Pass |
| 6-6 | Cu | 10 | Cr | 10 | 80 | 73 | 0 | 76 | 788 | Fail |
| 6-7 | Cu | 20 | Cr | 0 | 80 | 53 | 0 | 89 | >1000 | Pass |
| 6-8 | Cu | 20 | Cr | 5 | 75 | 46 | 0 | 86 | >1000 | Pass |
| 6-9 | Cu | 20 | Cr | 10 | 70 | 44 | 0 | 81 | >1000 | Pass |
| 6-10 | Cu | 20 | Cr | 15 | 65 | 38 | 0 | 72 | 652 | Fail |
| 6-11 | Cu | 30 | Cr | 0 | 70 | 33 | 0 | 90 | >1000 | Pass |
| 6-12 | Cu | 30 | Cr | 15 | 55 | 28 | 0 | 82 | >1000 | Pass |
| 6-13 | Cu | 30 | Cr | 20 | 50 | 25 | 0 | 72 | 663 | Fail |
| 6-14 | Cu | 35 | Cr | 0 | 65 | — | 80 | — | — | Fail |
| 6-15 | Cu | 35 | Cr | 5 | 60 | 40 | 0 | 90 | >1000 | Pass |
| 6-16 | Cu | 35 | Cr | 10 | 55 | 36 | 0 | 81 | >1000 | Pass |
| 6-17 | Cu | 40 | Cr | 0 | 60 | — | 40 | — | — | Fail |
| 6-18 | Cu | 40 | Cr | 5 | 55 | — | 60 | — | — | Fail |
| 6-19 | Cu | 40 | Cr | 10 | 50 | 20 | 0 | 88 | >1000 | Pass |
| 6-20 | Cu | 45 | Cr | 0 | 55 | — | 100 | — | — | Fail |
| 6-21 | Cu | 45 | Cr | 5 | 50 | — | 100 | — | — | Fail |

As evaluated in Experimental Example 1, when part of ITO in a resistive paste is substituted only by a densification promoting metal or a densification preventing metal, the ESR cannot be reduced below several tens of milliohms because of defects, such as the occurrence of blisters or deterioration in moisture resistance. By contrast, when part of ITO is substituted by a densification promoting metal and a densification preventing metal as in Experimental Example 3, the ESR can be reduced to approximately 10 mΩ or less while the occurrence of blisters is reduced and high reliability in the humidity test is maintained, as shown by Tables 3 to 8. Tables 3 to 8 show that Ni and Cu have substantially the same effects at the same substitution rate, and Mo, Cr, and Nb have substantially the same effects at the same substitution rate.

FIG. 5 is a ternary diagram of ITO, densification promoting metal (Mp), and densification preventing metal (Mc) and illustrates the component ratio of ITO, Mp (Ni and Cu), and Mc (Mo, Cr, and Nb) in the resistive paste prepared in Experimental Example 3.

Among the capacitors shown in Tables 3 to 8, the compositions for capacitors that had no blisters and a life of more than 1000 hours in the humidity test (capacitors with the overall judgment "Pass") are indicated by the "O"s in the FIG. 5 diagram. On the other hand, the compositions for capacitors that had blisters or a life of less than 1000 hours in the humidity test (capacitors with the overall judgment "Fail") are indicated by the "X"s in the FIG. 5 diagram. In FIG. 5, the component ratio for the capacitor indicated by "No substitution" in Table 1 is also indicated by an "X".

In the case that the component ratio (ITO, Mp, Mc) is in a range included by a polygon defined by point A (95, 5, 0), point B (92.5, 5, 2.5), point C (55, 30, 15), point D (50, 40, 10), and point E (70, 30, 0) (including segments AB, BC, CD, DE, and EA) in FIG. 5, the resistive electrode layer had no blisters, a life of more than 1000 hours in the humidity test, and excellent film quality.

Experimental Example 4

In Experimental Example 4, as shown in Tables 9 to 12, part of ITO in a resistive paste was substituted by densification promoting oxides $Al_2O_3$ and $TiO_2$ and densification preventing oxides $ZrO_2$ and $ZnO_2$ evaluated in Experimental Example 2 to control the densification.

The total substitution rate of the densification promoting oxide and the densification preventing oxide ranged from 5% to 50% by volume. This is because the substitute oxide component is predominant at a total substitution rate above 50% by volume, and the resistive paste does not have its original function.

TABLE 9

| Sample number | Densification promoting metal species and substitution rate | | Densification preventing metal species and substitution rate | | ITO percentage (volume %) | ESR (mΩ) | Incidence of blister (%) | Relative density of resistive electrode layer (%) | Life in humidity test (hours) | Overall judgment |
|---|---|---|---|---|---|---|---|---|---|---|
| | Species | Volume % | Species | Volume % | | | | | | |
| 11-1 | $Al_2O_3$ | 20 | $ZrO_2$ | 0 | 80 | 258 | 0 | 79 | 959 | Fail |
| 11-2 | $Al_2O_3$ | 22 | $ZrO_2$ | 0 | 78 | 280 | 0 | 86 | >1000 | Pass |
| 11-3 | $Al_2O_3$ | 22 | $ZrO_2$ | 5 | 73 | 460 | 0 | 84 | >1000 | Pass |
| 11-4 | $Al_2O_3$ | 22 | $ZrO_2$ | 10 | 68 | 668 | 0 | 81 | >1000 | Pass |
| 11-5 | $Al_2O_3$ | 22 | $ZrO_2$ | 15 | 63 | 783 | 0 | 78 | 825 | Fail |
| 11-6 | $Al_2O_3$ | 25 | $ZrO_2$ | 0 | 75 | 320 | 0 | 88 | >1000 | Pass |
| 11-7 | $Al_2O_3$ | 25 | $ZrO_2$ | 10 | 65 | 782 | 0 | 84 | >1000 | Pass |
| 11-8 | $Al_2O_3$ | 25 | $ZrO_2$ | 15 | 60 | 1698 | 0 | 80 | 883 | Fail |
| 11-9 | $Al_2O_3$ | 30 | $ZrO_2$ | 0 | 70 | 493 | 0 | 90 | >1000 | Pass |
| 11-10 | $Al_2O_3$ | 30 | $ZrO_2$ | 15 | 55 | 5383 | 0 | 82 | >1000 | Pass |
| 11-11 | $Al_2O_3$ | 30 | $ZrO_2$ | 20 | 50 | 8978 | 0 | 78 | 650 | Fail |
| 11-12 | $Al_2O_3$ | 35 | $ZrO_2$ | 0 | 65 | — | 100 | — | — | Fail |

TABLE 9-continued

| Sample number | Densification promoting metal species and substitution rate Species | Volume % | Densification preventing metal species and substitution rate Species | Volume % | ITO percentage (volume %) | ESR (mΩ) | Incidence of blister (%) | Relative density of resistive electrode layer (%) | Life in humidity test (hours) | Overall judgment |
|---|---|---|---|---|---|---|---|---|---|---|
| 11-13 | Al₂O₃ | 35 | ZrO₂ | 5 | 60 | 2302 | 0 | 94 | >1000 | Pass |
| 11-14 | Al₂O₃ | 35 | ZrO₂ | 10 | 55 | 4501 | 0 | 90 | >1000 | Pass |
| 11-15 | Al₂O₃ | 40 | ZrO₂ | 0 | 60 | — | 100 | — | — | Fail |
| 11-16 | Al₂O₃ | 40 | ZrO₂ | 5 | 55 | — | 100 | — | — | Fail |
| 11-17 | Al₂O₃ | 40 | ZrO₂ | 10 | 50 | 7605 | 0 | 95 | >1000 | Pass |
| 11-18 | Al₂O₃ | 45 | ZrO₂ | 0 | 55 | — | 100 | — | — | Fail |
| 11-19 | Al₂O₃ | 45 | ZrO₂ | 5 | 50 | — | 100 | — | — | Fail |

TABLE 10

| Sample number | Densification promoting metal species and substitution rate Species | Volume % | Densification preventing metal species and substitution rate Species | Volume % | ITO percentage (volume %) | ESR (mΩ) | Incidence of blister (%) | Relative density of resistive electrode layer (%) | Life in humidity test (hours) | Overall judgment |
|---|---|---|---|---|---|---|---|---|---|---|
| 12-1 | Al₂O₃ | 20 | ZnO₂ | 0 | 80 | 258 | 0 | 79 | 959 | Fail |
| 12-2 | Al₂O₃ | 22 | ZnO₂ | 0 | 78 | 280 | 0 | 86 | >1000 | Pass |
| 12-3 | Al₂O₃ | 22 | ZnO₂ | 5 | 73 | 391 | 0 | 82 | >1000 | Pass |
| 12-4 | Al₂O₃ | 22 | ZnO₂ | 10 | 68 | 559 | 0 | 80 | >1000 | Pass |
| 12-5 | Al₂O₃ | 22 | ZnO₂ | 15 | 63 | 692 | 0 | 73 | 755 | Fail |
| 12-6 | Al₂O₃ | 25 | ZnO₂ | 0 | 75 | 320 | 0 | 88 | >1000 | Pass |
| 12-7 | Al₂O₃ | 25 | ZnO₂ | 10 | 65 | 653 | 0 | 83 | >1000 | Pass |
| 12-8 | Al₂O₃ | 25 | ZnO₂ | 15 | 60 | 1215 | 0 | 72 | 742 | Fail |
| 12-9 | Al₂O₃ | 30 | ZnO₂ | 0 | 70 | 493 | 0 | 90 | >1000 | Pass |
| 12-10 | Al₂O₃ | 30 | ZnO₂ | 15 | 55 | 3725 | 0 | 82 | >1000 | Pass |
| 12-11 | Al₂O₃ | 30 | ZnO₂ | 20 | 50 | 5256 | 0 | 70 | 586 | Fail |
| 12-12 | Al₂O₃ | 35 | ZnO₂ | 0 | 65 | — | 100 | — | — | Fail |
| 12-13 | Al₂O₃ | 35 | ZnO₂ | 5 | 60 | 1892 | 0 | 89 | >1000 | Pass |
| 12-14 | Al₂O₃ | 35 | ZnO₂ | 10 | 55 | 2531 | 0 | 86 | >1000 | Pass |
| 12-15 | Al₂O₃ | 40 | ZnO₂ | 0 | 60 | — | 100 | — | — | Fail |
| 12-16 | Al₂O₃ | 40 | ZnO₂ | 5 | 55 | — | 100 | — | — | Fail |
| 12-17 | Al₂O₃ | 40 | ZnO₂ | 10 | 50 | 5528 | 0 | 91 | >1000 | Pass |
| 12-18 | Al₂O₃ | 45 | ZnO₂ | 0 | 55 | — | 100 | — | — | Fail |
| 12-19 | Al₂O₃ | 45 | ZnO₂ | 5 | 50 | — | 100 | — | — | Fail |

TABLE 11

| Sample number | Densification promoting metal species and substitution rate Species | Volume % | Densification preventing metal species and substitution rate Species | Volume % | ITO percentage (volume %) | ESR (mΩ) | Incidence of blister (%) | Relative density of resistive electrode layer (%) | Life in humidity test (hours) | Overall judgment |
|---|---|---|---|---|---|---|---|---|---|---|
| 13-1 | TiO₂ | 20 | ZrO₂ | 0 | 80 | 328 | 0 | 79 | — | Fail |
| 13-2 | TiO₂ | 22 | ZrO₂ | 0 | 78 | 369 | 0 | 83 | >1000 | Pass |
| 13-3 | TiO₂ | 22 | ZrO₂ | 5 | 73 | 511 | 0 | 82 | >1000 | Pass |
| 13-4 | TiO₂ | 22 | ZrO₂ | 10 | 68 | 725 | 0 | 81 | >1000 | Pass |
| 13-5 | TiO₂ | 22 | ZrO₂ | 15 | 63 | 878 | 0 | 79 | 855 | Fail |
| 13-6 | TiO₂ | 25 | ZrO₂ | 0 | 75 | 521 | 0 | 88 | >1000 | Pass |
| 13-7 | TiO₂ | 25 | ZrO₂ | 10 | 65 | 901 | 0 | 84 | >1000 | Pass |
| 13-8 | TiO₂ | 25 | ZrO₂ | 15 | 60 | 1898 | 0 | 79 | 883 | Fail |
| 13-9 | TiO₂ | 30 | ZrO₂ | 0 | 70 | 703 | 0 | 85 | >1000 | Pass |
| 13-10 | TiO₂ | 30 | ZrO₂ | 15 | 55 | 6253 | 0 | 80 | >1000 | Pass |
| 13-11 | TiO₂ | 30 | ZrO₂ | 20 | 50 | 9211 | 0 | 76 | 711 | Fail |
| 13-12 | TiO₂ | 35 | ZrO₂ | 0 | 65 | — | 100 | — | — | Fail |
| 13-13 | TiO₂ | 35 | ZrO₂ | 5 | 60 | 2752 | 0 | 90 | >1000 | Pass |
| 13-14 | TiO₂ | 35 | ZrO₂ | 10 | 55 | 5211 | 0 | 87 | >1000 | Pass |
| 13-15 | TiO₂ | 40 | ZrO₂ | 0 | 60 | — | 100 | — | — | Fail |
| 13-16 | TiO₂ | 40 | ZrO₂ | 5 | 55 | — | 100 | — | — | Fail |
| 13-17 | TiO₂ | 40 | ZrO₂ | 10 | 50 | 8032 | 0 | 89 | >1000 | Pass |
| 13-18 | TiO₂ | 45 | ZrO₂ | 0 | 55 | — | 100 | — | — | Fail |
| 13-19 | TiO₂ | 45 | ZrO₂ | 5 | 50 | — | 100 | — | — | Fail |

TABLE 12

| Sample number | Densification promoting metal species and substitution rate Species | Volume % | Densification preventing metal species and substitution rate Species | Volume % | ITO percentage (volume %) | ESR (mΩ) | Incidence of blister (%) | Relative density of resistive electrode layer (%) | Life in humidity test (hours) | Overall judgment |
|---|---|---|---|---|---|---|---|---|---|---|
| 14-1 | TiO$_2$ | 20 | ZnO$_2$ | 0 | 80 | 328 | 0 | 79 | 972 | Fail |
| 14-2 | TiO$_2$ | 22 | ZnO$_2$ | 0 | 78 | 369 | 0 | 83 | >1000 | Pass |
| 14-3 | TiO$_2$ | 22 | ZnO$_2$ | 5 | 73 | 469 | 0 | 82 | >1000 | Pass |
| 14-4 | TiO$_2$ | 22 | ZnO$_2$ | 10 | 68 | 663 | 0 | 81 | >1000 | Pass |
| 14-5 | TiO$_2$ | 22 | ZnO$_2$ | 15 | 63 | 703 | 0 | 79 | 856 | Fail |
| 14-6 | TiO$_2$ | 25 | ZnO$_2$ | 0 | 75 | 521 | 0 | 88 | >1000 | Pass |
| 14-7 | TiO$_2$ | 25 | ZnO$_2$ | 10 | 65 | 811 | 0 | 85 | >1000 | Pass |
| 14-8 | TiO$_2$ | 25 | ZnO$_2$ | 15 | 60 | 1523 | 0 | 80 | 911 | Fail |
| 14-9 | TiO$_2$ | 30 | ZnO$_2$ | 0 | 70 | 703 | 0 | 85 | >1000 | Pass |
| 14-10 | TiO$_2$ | 30 | ZnO$_2$ | 15 | 55 | 4325 | 0 | 82 | >1000 | Pass |
| 14-11 | TiO$_2$ | 30 | ZnO$_2$ | 20 | 50 | 7113 | 0 | 74 | 713 | Fail |
| 14-12 | TiO$_2$ | 35 | ZnO$_2$ | 0 | 65 | — | 100 | — | — | Fail |
| 14-13 | TiO$_2$ | 35 | ZnO$_2$ | 5 | 60 | 1998 | 0 | 89 | >1000 | Pass |
| 14-14 | TiO$_2$ | 35 | ZnO$_2$ | 10 | 55 | 3999 | 0 | 89 | >1000 | Pass |
| 14-15 | TiO$_2$ | 40 | ZnO$_2$ | 0 | 60 | — | 100 | — | — | Fail |
| 14-16 | TiO$_2$ | 40 | ZnO$_2$ | 5 | 55 | — | 100 | — | — | Fail |
| 14-17 | TiO$_2$ | 40 | ZnO$_2$ | 10 | 50 | 6225 | 0 | 90 | >1000 | Pass |
| 14-18 | TiO$_2$ | 45 | ZnO$_2$ | 0 | 55 | — | 100 | — | — | Fail |
| 14-19 | TiO$_2$ | 45 | ZnO$_2$ | 5 | 50 | — | 100 | — | — | Fail |

As evaluated in Experimental Example 2, when part of ITO in a resistive paste is substituted only by a densification promoting oxide or a densification preventing oxide, the ESR cannot be increased above several hundreds of milliohms because of defects, such as the occurrence of blisters or deterioration in moisture resistance. In contrast, when part of ITO is substituted by a densification promoting oxide and a densification preventing oxide as in Experimental Example 4, the ESR can be increased to several thousands of milliohms while the occurrence of blisters is reduced and high reliability in the humidity test is maintained. Tables 9 to 12 show that Al$_2$O$_3$ and TiO$_2$ have substantially the same effects at the same substitution rate, and ZrO$_2$ and ZnO$_2$ have substantially the same effects at the same substitution rate.

FIG. 6 is a ternary diagram of ITO, densification promoting oxide (Op), and densification preventing oxide (Oc) and illustrates the component ratio of ITO, Op (Al$_2$O$_3$ and TiO$_2$), and Oc (ZrO$_2$ and ZnO$_2$) in the resistive paste prepared in Experimental Example 4.

Among the capacitors shown in Tables 9 to 12, the compositions for capacitors that had no blisters and a life of more than 1000 hours in the humidity test (capacitors with the overall judgment "Pass") are at the points designated by "O" in FIG. 6. On the other hand, the compositions for capacitors that had blisters or a life of less than 1000 hours in the humidity test (capacitors with the overall judgment "Fail") are at the points designated by "X" in FIG. 6. In FIG. 6, the component ratio for the capacitor indicated by "No substitution" in Table 2 is also indicated by an "X".

In the case that the component ratio (ITO, Op, Oc) is in a range included by a polygon defined by point F (78, 22, 0), point G (68, 22, 10), point H (55, 30, 15), point K (50, 40, 10), and point L (70, 30, 0) (including segments FG, GH, HK, KL, and LF) in FIG. 6, the resistive electrode layer had no blisters, a life of more than 1000 hours in the humidity test, and excellent film quality.

Experimental Example 5

In Experimental Example 5, it was proved that the low-resistance paste evaluated in Experimental Example 3 in which ITO was substituted by a densification promoting or preventing metal and the high-resistance paste evaluated in Experimental Example 4 in which ITO was substituted by a densification promoting or preventing oxide can be mixed to facilitate the control of the specific resistance of a sintered compact of the mixed resistive paste, that is, the ESR of a monolithic ceramic capacitor.

More specifically, as shown in Table 13, a mixture of the low-resistance paste used for the capacitor 1-5 in Table 3 in Experimental Example 3 and the high-resistance paste used for the capacitor 11-4 in Table 9 in Experimental Example 4 and a mixture of the low-resistance paste used for the capacitor 1-3 in Table 3 in Experimental Example 3 and the high-resistance paste used for the capacitor 11-16 in Table 9 in Experimental Example 4 were evaluated. In these mixtures, the percentages of the high-resistance paste were 0%, 10%, 30%, 50%, 70%, 90%, and 100% by weight.

Monolithic ceramic capacitors were manufactured through the process used in Experimental Examples 1 to 4 and were evaluated in the same manner. Table 13 shows the evaluation results.

TABLE 13

| | Percentage of high-resistance paste (weight %) | ESR (mΩ) | Incidence of blister (%) | Relative density of resistive electrode layer (%) | Life in humidity test (hours) |
|---|---|---|---|---|---|
| Mixture of pastes used in capacitors 1-5 and 11-4 | 0 | 53 | 0 | 83 | >1000 |
| | 10 | 60 | 0 | 83 | >1000 |
| | 30 | 130 | 0 | 81 | >1000 |
| | 50 | 195 | 0 | 82 | >1000 |
| | 70 | 315 | 0 | 81 | >1000 |
| | 90 | 532 | 0 | 82 | >1000 |
| | 100 | 668 | 0 | 81 | >1000 |
| Mixture of pastes used in capacitors 1-3 and 11-16 | 0 | 65 | 0 | 75 | 752 |
| | 10 | 88 | 0 | 77 | 805 |
| | 30 | 150 | 0 | 80 | >1000 |
| | 50 | 288 | 0 | 83 | >1000 |
| | 70 | — | 60 | — | — |
| | 90 | — | 100 | — | — |
| | 100 | — | 100 | — | — |

Figure 7:
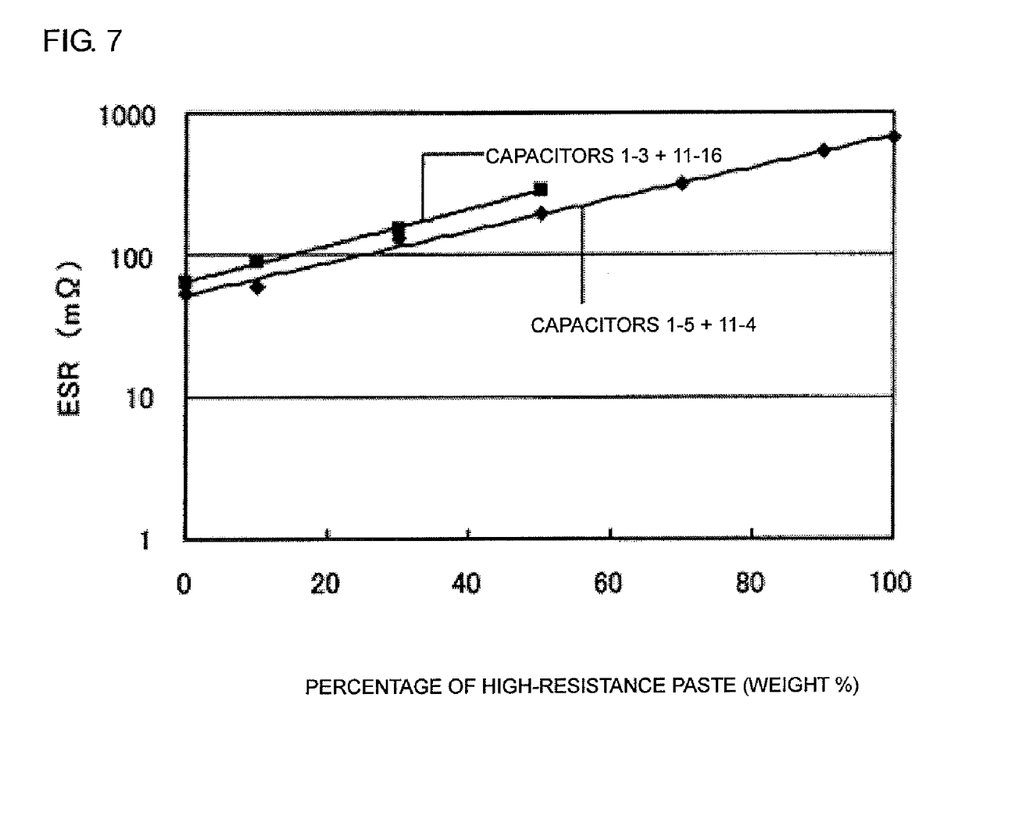
FIG. 7 is a graph of the ESR of a monolithic ceramic capacitor manufactured using a resistive paste that contains a mixture of a low-resistance paste and a high-resistance paste prepared in Experimental Example 5, as a function of the percentage of the high-resistance paste.

FIG. 7 is a graph of ESR as a function of the percentage of a high-resistance paste shown in Table 13.

Table 13 and FIG. 7 show that there is a correlation between the percentage of a high-resistance paste and ESR and that the percentage of a high-resistance paste can be altered to control ESR easily.

In a mixture of pastes used in the capacitors 1-5 and 11-4, no blister was observed, and high reliability was maintained in the humidity test at a percentage of a high-resistance paste in the range of 0% to 100% by weight. In a mixture of pastes used in the capacitors 1-3 and 11-16, the reliability in the humidity test deteriorated at a percentage of a high-resistance paste in the range of 0% to 10% by weight, and blisters were observed at a percentage of a high-resistance paste in the range of 70% to 100% by weight. This is because the paste used in the capacitor 1-3 was out of the range included by a polygon defined by points ABCDE in FIG. 5, and the paste used in the capacitor 11-16 was out of the range included by a polygon defined by points FGHKL in FIG. 6. However, it should be noted that, even with a mixture of pastes used in the capacitors 1-3 and 11-16, at a percentage of a high-resistance paste in the range of 30% to 50% by weight, the mixed paste can prevent the occurrence of blisters and exhibit high reliability in the humidity test.

The invention claimed is:

1. A resistive paste that comprising an In—Sn complex oxide; a glass frit; an organic vehicle;
   a densification promoting metal or metal oxide that promotes densification of a sintered compact formed by firing the resistive paste and is at least one member selected from the group consisting of Ni, Cu, $Al_2O_3$ and $TiO_2$; and
   a densification preventing metal or metal oxide that prevents the densification and is at least one member selected from the group consisting of Mo, Cr, Nb, $ZrO_2$ and $ZnO_2$.

2. A resistive paste according to claim 1, wherein the densification promoting metal or metal oxide is at least one member selected from the group consisting of Ni and Cu, and the densification preventing metal or metal oxide is at least one member selected from the group consisting of Mo, Cr, and Nb.

3. A resistive paste according to claim 2, wherein the component ratio (ITO, Mp, Mc) of the In—Sn complex oxide (ITO), the densification promoting metal (Mp), and the densification preventing metal (Mc) on the basis of volume percent is in a range included by a polygon defined by point A (95, 5, 0), point B (92.5, 5, 2.5), point C (55, 30, 15), point D (50, 40, 10), and point E (70, 30, 0) (including segments AB, BC, CD, DE, and EA) of the ternary diagram of FIG. 5.

4. A resistive paste according to claim 3 in combination with a second resistive paste comprising an In—Sn complex oxide; a glass frit; an organic vehicle; a densification promoting metal or metal oxide that promotes densification of a sintered compact formed by firing the resistive paste and is at least one member selected from the group consisting of $Al_2O_3$ and $TiO_2$; and a densification preventing metal or metal oxide that prevents the densification and is at least one member selected from the group consisting of ZrO, and $ZnO_2$;
   wherein the second resistive paste component ratio (ITO, Op, Oc) of the In—Sn complex oxide (ITO), the densification promoting oxide (Op), and the densification preventing oxide (Oc) on the basis of volume percent is in a range included by a polygon defined by point F (78, 22, 0), point G (68, 22, 10), point H (55, 30, 15), point K (50, 40, 10), and point L (70, 30, 0) (including segments FG, GH, HK, KL, and LF) on the ternary diagram of FIG. 6.

5. A monolithic ceramic capacitor comprising:
   a ceramic laminate comprising a plurality of ceramic layers;
   an internal electrode disposed in the ceramic laminate; and
   an external electrode disposed on an outer surface of the ceramic laminate and electrically connected to the internal electrode,
   wherein the external electrode comprises a resistive electrode layer and an electroconductive electrode layer disposed on the resistive electrode layer, and the resistive electrode layer is a sintered compact of a resistive paste according to claim 4.

6. A monolithic ceramic capacitor comprising:
   a ceramic laminate comprising a plurality of ceramic layers;
   an internal electrode disposed in the ceramic laminate; and
   an external electrode disposed on an outer surface of the ceramic laminate and electrically connected to the internal electrode,
   wherein the external electrode comprises a resistive electrode layer and an electroconductive electrode layer disposed on the resistive electrode layer, and the resistive electrode layer is a sintered compact of a resistive paste according to claim 3.

7. A monolithic ceramic capacitor comprising:
   a ceramic laminate comprising a plurality of ceramic layers;
   an internal electrode disposed in the ceramic laminate; and
   an external electrode disposed on an outer surface of the ceramic laminate and electrically connected to the internal electrode,
   wherein the external electrode comprises a resistive electrode layer and an electroconductive electrode layer disposed on the resistive electrode layer, and the resistive electrode layer is a sintered compact of a resistive paste according to claim 2.

8. A resistive paste according to claim 1, wherein the densification promoting metal or metal oxide is at least one member selected from the group consisting of $Al_2O_3$ and $TiO_2$; and the densification preventing metal or metal oxide is at least one member selected from the group consisting of $ZrO_2$ and $ZnO_2$.

9. A resistive paste according to claim 8, wherein the component ratio (ITO, Op, Oc) of the In—Sn complex oxide (ITO), the densification promoting oxide (Op), and the densification preventing oxide (Oc) on the basis of volume percent is in a range included by a polygon defined by point F (78, 22, 0), point G (68, 22, 10), point H (55, 30, 15), point K (50, 40, 10), and point L (70, 30, 0) (including segments FG, GH, HK, KL, and LF) on the ternary diagram of FIG. 6.

10. A monolithic ceramic capacitor comprising:
    a ceramic laminate comprising a plurality of ceramic layers;
    an internal electrode disposed in the ceramic laminate; and
    an external electrode disposed on an outer surface of the ceramic laminate and electrically connected to the internal electrode,
    wherein the external electrode comprises a resistive electrode layer and an electroconductive electrode layer disposed on the resistive electrode layer, and the resistive electrode layer is a sintered compact of a resistive paste according to claim 9.

11. A resistive paste according to claim 8 in combination with a second resistive paste comprising an In—Sn complex oxide; a glass frit; an organic vehicle; a densification promoting metal or metal oxide that promotes densification of a sintered compact formed by firing the resistive paste and is at least one member selected from the group consisting of Ni, and Cu; and a densification preventing metal or metal oxide that prevents the densification and is at least one member selected from the group consisting of Mo, Cr, and Nb.

12. A monolithic ceramic capacitor comprising:
a ceramic laminate comprising a plurality of ceramic layers;
an internal electrode disposed in the ceramic laminate; and
an external electrode disposed on an outer surface of the ceramic laminate and electrically connected to the internal electrode,
wherein the external electrode comprises a resistive electrode layer and an electroconductive electrode layer disposed on the resistive electrode layer, and the resistive electrode layer is a sintered compact of a resistive paste according to claim 11.

13. A monolithic ceramic capacitor comprising:
a ceramic laminate comprising a plurality of ceramic layers;
an internal electrode disposed in the ceramic laminate; and
an external electrode disposed on an outer surface of the ceramic laminate and electrically connected to the internal electrode,
wherein the external electrode comprises a resistive electrode layer and an electroconductive electrode layer disposed on the resistive electrode layer, and the resistive electrode layer is a sintered compact of a resistive paste according to claim 8.

14. A resistive paste according to claim 1 wherein the densification promoting metal or metal oxide is a mixture of metal and metal oxide, and the densification preventing metal or metal oxide is a mixture of metal and metal oxide.

15. A resistive paste according to claim 14 wherein the component ratio (ITO, Dp, Dc) of the In—Sn complex oxide (ITO), the densification promoting metal or metal oxide (Dp), and the densification preventing metal or metal oxide (Dc) on the basis of volume percent is in a range included by a polygon defined by point F (78, 22, 0), point G (68, 22, 10), point H (55, 30, 15), point K (50, 40, 10), and point L (70, 30, 0) (including segments FG, GH, HK, KL, and LF) on a ternary diagram of ITO, Dp, and Dc.

16. A monolithic ceramic capacitor comprising:
a ceramic laminate comprising a plurality of ceramic layers;
an internal electrode disposed in the ceramic laminate; and
an external electrode disposed on an outer surface of the ceramic laminate and electrically connected to the internal electrode,
wherein the external electrode comprises a resistive electrode layer and an electroconductive electrode layer disposed on the resistive electrode layer, and the resistive electrode layer is a sintered compact of a resistive paste according to claim 15.

17. A monolithic ceramic capacitor comprising:
a ceramic laminate comprising a plurality of ceramic layers;
an internal electrode disposed in the ceramic laminate; and
an external electrode disposed on an outer surface of the ceramic laminate and electrically connected to the internal electrode,
wherein the external electrode comprises a resistive electrode layer and an electroconductive electrode layer disposed on the resistive electrode layer, and the resistive electrode layer is a sintered compact of a resistive paste according to claim 14.

18. A monolithic ceramic capacitor comprising:
a ceramic laminate comprising a plurality of ceramic layers;
an internal electrode disposed in the ceramic laminate; and
an external electrode disposed on an outer surface of the ceramic laminate and electrically connected to the internal electrode,
wherein the external electrode comprises a resistive electrode layer and an electroconductive electrode layer disposed on the resistive electrode layer, and the resistive electrode layer is a sintered compact of a resistive paste according to claim 1.

19. A monolithic ceramic capacitor according to claim 18, wherein a Sn or solder layer is disposed on the electroconductive layer.

20. A monolithic ceramic capacitor according to claim 19, wherein a Sn or solder plated layer is disposed on a Ni-containing electroconductive layer.

* * * * *